(12) United States Patent
Nordlin et al.

(10) Patent No.: US 8,647,032 B2
(45) Date of Patent: Feb. 11, 2014

(54) HOLE SAW WITH DEPTH STOP

(75) Inventors: William Nordlin, Poplar Grove, IL (US); Wilbur Keith Moffatt, Freeport, IL (US)

(73) Assignee: Textron Innovations Inc., Providence, RI (US)

( * ) Notice: Subject to any disclaimer, the term of this patent is extended or adjusted under 35 U.S.C. 154(b) by 1154 days.

(21) Appl. No.: 12/579,655

(22) Filed: Oct. 15, 2009

(65) Prior Publication Data

US 2010/0034608 A1 Feb. 11, 2010

Related U.S. Application Data

(63) Continuation-in-part of application No. 12/018,890, filed on Jan. 24, 2008, now Pat. No. 7,661,913.

(60) Provisional application No. 60/897,317, filed on Jan. 25, 2007.

(51) Int. Cl.
*B23B 51/04* (2006.01)
(52) U.S. Cl.
USPC .......................................... 408/202; 408/204
(58) Field of Classification Search
USPC ................... 408/204–209, 202, 703
See application file for complete search history.

(56) References Cited

U.S. PATENT DOCUMENTS

| | | | |
|---|---|---|---|
| 201,908 A | 4/1878 | Brockett | |
| 417,486 A | 12/1889 | Isabel | |
| 1,522,102 A | 6/1925 | Cibelli | |
| 1,705,049 A | 3/1929 | Fournier | |
| 1,994,516 A | 3/1935 | Hawn | |
| 2,319,528 A | 5/1943 | Barbour et al. | |
| 4,297,059 A | 10/1981 | Miyanaga | |
| 4,652,185 A | 3/1987 | Malrick | |
| 4,941,783 A | 7/1990 | Maier | |
| 5,147,164 A | 9/1992 | Fraver | |
| 5,205,685 A | 4/1993 | Herbert | |
| 5,433,560 A | 7/1995 | Duncan | |
| 5,816,752 A * | 10/1998 | Benjamin | 408/68 |
| 5,915,893 A | 6/1999 | Miyanaga | |
| 7,661,913 B2 * | 2/2010 | Nordlin | 408/202 |
| 2008/0181738 A1 | 7/2008 | Capriotti et al. | |

FOREIGN PATENT DOCUMENTS

| | | |
|---|---|---|
| DE | 299 07 717 | 8/1999 |
| DE | 100 32 966 | 7/2000 |
| JP | 5-318217 | 12/1993 |
| JP | 05318216 A * | 12/1993 |

* cited by examiner

*Primary Examiner* — Daniel Howell
(74) *Attorney, Agent, or Firm* — Klintworth & Rozenblat IP LLC

(57) ABSTRACT

A hole saw includes a depth stop for limiting the depth of penetration of the hole saw into a workpiece. The blade of the hole saw includes a plurality of slots, one of which is used to receive the depth stop. The depth stop is mounted to the blade by positioning a portion of the depth stop within the slot and sliding the depth stop from an unsecured position to a secured position. Once in the secured position, a locking member is moved within the depth stop to secure the depth stop in place. In use, the blade is advanced through the workpiece until the depth stop contacts the proximal surface of the workpiece.

27 Claims, 14 Drawing Sheets

HOLE SAW WITH DEPTH STOP

This application is a continuation-in-part of U.S. patent application Ser. No. 12/018,890, filed on Jan. 24, 2008 which claims the domestic benefit of U.S. Provisional Application Ser. No. 60/897,317 filed on Jan. 25, 2007. The disclosures of Ser. Nos. 12/018,890 and 60/897,317 are hereby incorporated by reference.

FIELD OF THE INVENTION

This invention is generally directed to a hole saw with a depth stop.

BACKGROUND OF THE INVENTION

Hole saws have been used by tradesman for drilling holes in paneling and the like for a number of years. In particular, electricians routinely use hole saws made from a tubularly-shaped saw blade to drill holes into electrical boxes made out of sheet metal to allow the ingress and egress of wires. After the hole is drilled, the slug which has been cut away, often remains lodged in the blade. Typically, these hole saws have at least one oval-shaped slot located on the side of the blade. The slot has a longitudinal axis that is parallel with the direction of drilling. This slot allows the user to slip a tool such as a screw driver into the slot behind the slug and force the slug out of the blade.

Many times, these hole saws are used when wires are already present within the box. This presents the danger that some of the wires already present will be cut or otherwise damaged during the hole cutting operation as the hole saw penetrates the panel. The cut or damaged wires present an electrical hazard once the wires are energized. As a result of this need, many hole saws have been developed to provide some means for limiting the penetration of the blade and therefore greatly reducing the possibility of damaging existing wiring within the electrical box.

One example of such a hole saw is disclosed by U.S. Pat. No. 1,522,102 which discloses a hand-powered boring drill whose drilling depth is controlled by a surface found on the bottom of the component that serves as the handle for the saw. This hole saw has disadvantages including that the stop requires four screws for attaching it to the hole saw, that the components are larger and more expensive than necessary, and that it is not adapted to be driven by an electrical drill as is now standard in the industry.

Another hole saw that has control of the drilling depth is described in U.S. Pat. No. 1,705,049 which discloses the use of a collar that is located about the circumference of the hole saw and is held in place by a locking member that impinges upon the outside circumference of the hole saw. However, this hole saw has the disadvantage that different sized collars for hole saws of different diameters are needed. This increases the cost and complexity of the overall system.

U.S. Pat. No. 5,205,685 discloses a hole saw that has a plastic or metal collar that is attached to the circumference of the hole saw by welding or adhesive. This hole saw also has the disadvantage that different sized collars are needed for different diameters which increases the cost and complexity of the overall system. Furthermore, the attachment of the stop collar is permanent, preventing removal when it is desired to allow deep penetration of the hole saw.

For these reasons, there still exists a need for a hole saw that has a depth stop that is easy to attach to the hole saw, that can be used with hole saws of differing diameters, that can be easily detached from the hole saw when desired, that allows the removal of a slug that is trapped within the inner circumference of the hole saw, and that can be inexpensively manufactured.

SUMMARY OF THE INVENTION

Briefly, the present invention discloses a hole saw which includes a blade and a depth stop. A plurality of slots are provided through the blade and the depth stop is removably mounted in one of the plurality of slots. The blade with the mounted depth stop is then rotated by an associated drill to form a hole in the workpiece. As the blade penetrates the workpiece, the end surface of the depth stop contacts the surface of the workpiece to prevent further penetration of the blade through the workpiece. Once the hole has been cut, a toot can be inserted in one of the available slots to remove the slug from the blade. In addition, the depth stop can be removed from the blade to allow deeper penetration of the hole saw into the workpiece.

BRIEF DESCRIPTION OF THE DRAWINGS

The organization and manner of the structure and operation of the invention, together with further objects and advantages thereof may best be understood by reference to the following description, taken in connection with the accompanying drawings, wherein like reference numerals identify like elements in which.

DETAILED DESCRIPTION OF THE ILLUSTRATED EMBODIMENTS

Figure 1:
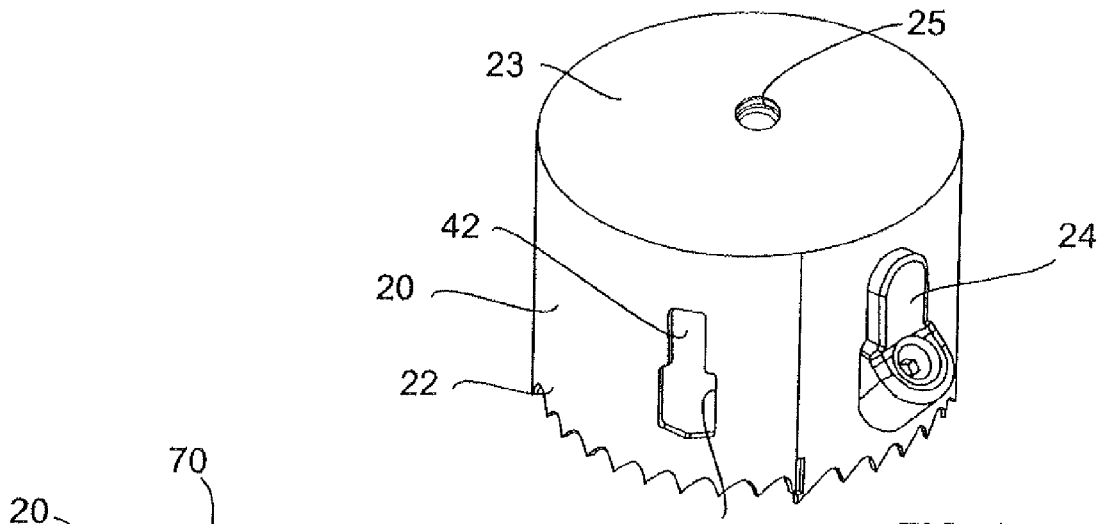
FIG. 1 is a perspective view of a hole saw and a depth stop which incorporates features of the present invention, wherein the depth stop is shown in a secured position.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A hole saw 20 is shown assembled with a depth stop 24 in FIGS. 1-5. The hole saw 20 includes a blade 22 and a backplate 23 which are permanently affixed together such as by welding as is known in the art. A mounting aperture 25, for example, is provided for mounting the hole saw 20 to a driving mechanism, such as an electric hand drill (not shown), for drilling a hole through a workpiece as will be described herein. For ease of description, surfaces and elements positioned closest to the user when the hole saw 20 is in use are referred to as proximal elements and surfaces and elements furthest from the user are referred to as distal elements.

Figure 6:
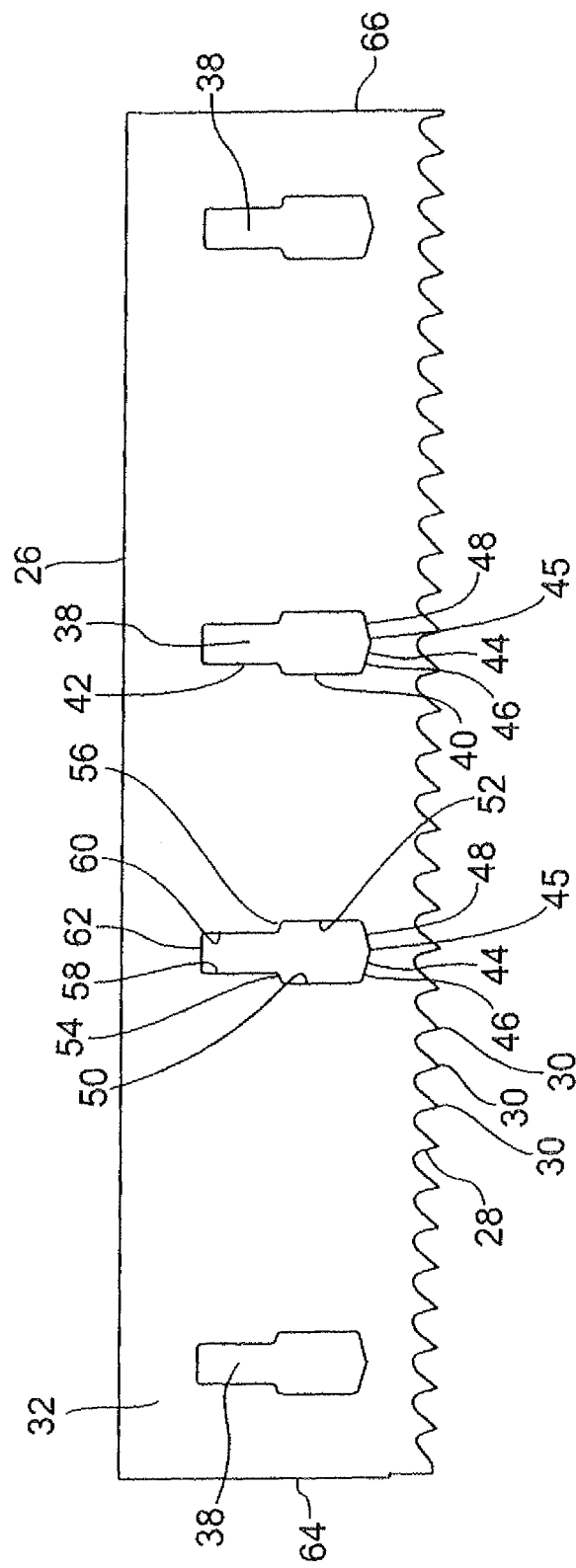
FIG. 6 is an elevational view of the stamped material from which the blade of the hole saw is formed.

The blade 22 is generally tubularly-shaped and includes a circularly-shaped proximal edge 26, shown in FIG. 6, which is mounted to the back plate 23. The blade 22 also includes a generally circularly-shaped distal edge 28 having cutting teeth 30.

The blade 22 is formed from a piece of flat stock 32 shown in FIG. 6. The flat stock 32 provides the distal edge 28 along with the teeth 30 of the blade 22, and the linear proximal edge 26. Identically formed slots 38 are provided through the flat stock 32 and at spaced apart locations. As shown, four identically formed slots 38 are equidistantly positioned along the length of the flat stock 32. Each slot 38 generally looks like a key hole. Each slot 38 includes a first portion 40 spaced from the distal edge 28 of the blade 22 and a second portion 42 spaced from the proximal edge 26 of the blade 22 such that the edges 26, 28 of the blade 22 are not interrupted by the slots 38. The first portion 40 of each slot 38 is wider than the second portion 42 of each slot 38. Each slot 38 is defined by a plurality of perimeter walls including a distal end wall 44 formed by a first segment 46 and a second segment 48; a first side wall 50 extending from the first segment 46; a second side wall 52 extending from the second segment 48; a first transition wall 54 extending from the first side wall 50 in a direction generally perpendicular to the first side wall 50; a second transition wall 56 extending from the second side wall 52 in a direction generally perpendicular to the second side wall 52; a third side wall 58 extending from the first transition wall 54 in a direction generally perpendicular to the first transition wall 54; a fourth side wall 60 extending from the second transition wall 56 in a direction generally perpendicular to the second transition wall 56; and a proximal end wall 62 opposite the distal side wall 44 and extending between ends of the third and fourth side walls 58, 60. The first, second, third and fourth side walls 50, 52, 58, 60 are generally parallel to one another and the proximal end wall 62 and the first and second transition walls 54, 56 are generally perpendicular to the first, second, third and fourth side walls 50, 52, 58, 60. The first and second segments 46, 48 of the distal end wall 44 meet at a distal point 45 and form an angle of approximately 150 degrees.

Figure 2:
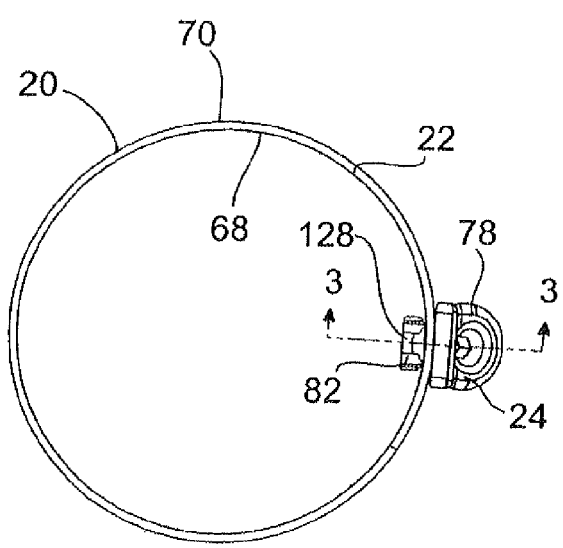
FIG. 2 is a bottom plan view of the hole saw and depth stop wherein the back plate of the hole saw has been removed.

To form the tubularly-shaped blade 22, opposite ends 64, 66 of the flat stock 32 are welded together providing an interior surface 68 and an exterior surface 70, see FIG. 2. Prior to welding opposite ends 64, 66, the slot 38 and the teeth 30 of the blade 22 are formed on the flat stock 32 preferably using a die and punch but can also be formed by any other means commonly known in the art.

Figure 7:
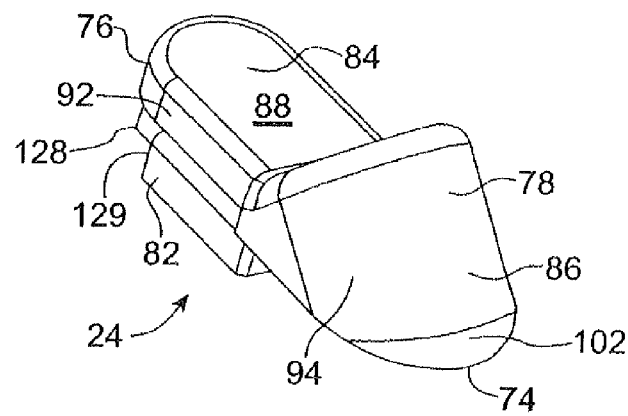
FIG. 7 is a perspective view of the depth stop which incorporates the features of a first embodiment of the invention.
Figure 8:
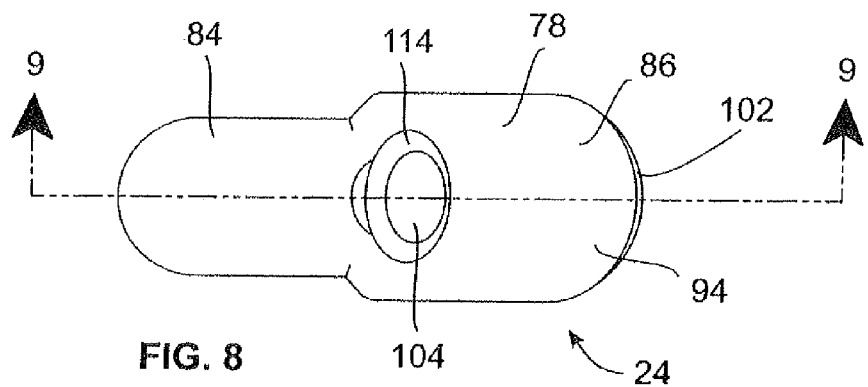
FIG. 8 is an elevational view of the depth stop of FIG. 7.
Figure 9:
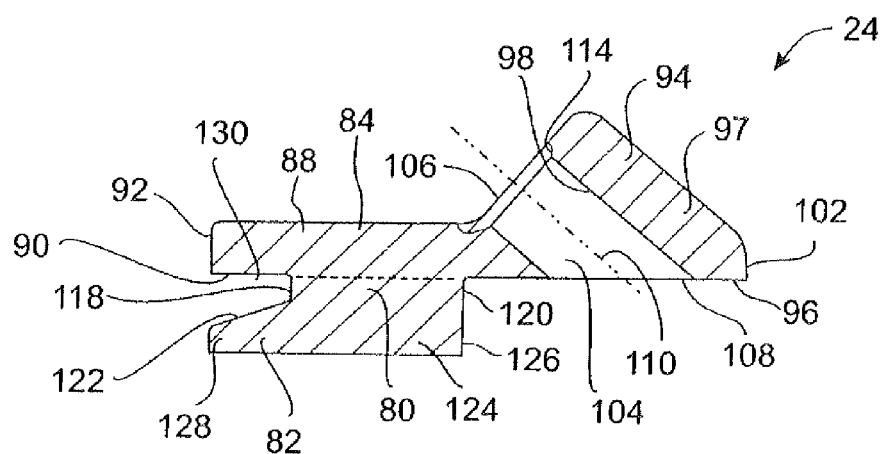
FIG. 9 is a cross-sectional view of the depth stop along line 9-9 of FIG. 8.
Figure 10:
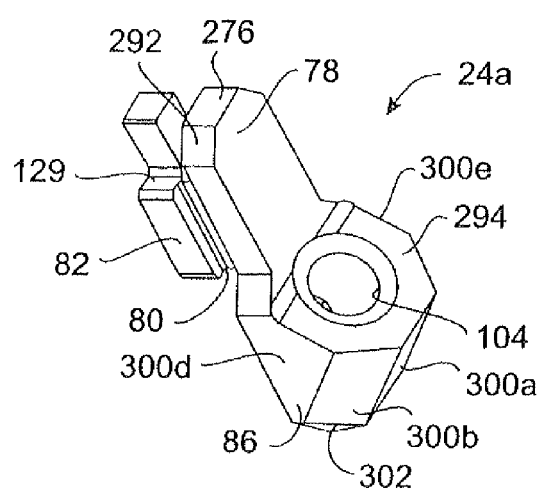
FIG. 10 is a perspective view of the depth stop which incorporates the features of a second embodiment of the invention.
Figure 11:
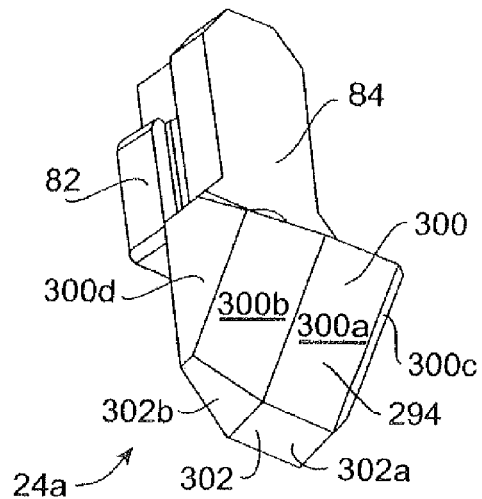
FIG. 11 is an alternative perspective view of the depth stop of FIG. 10.
Figure 12:
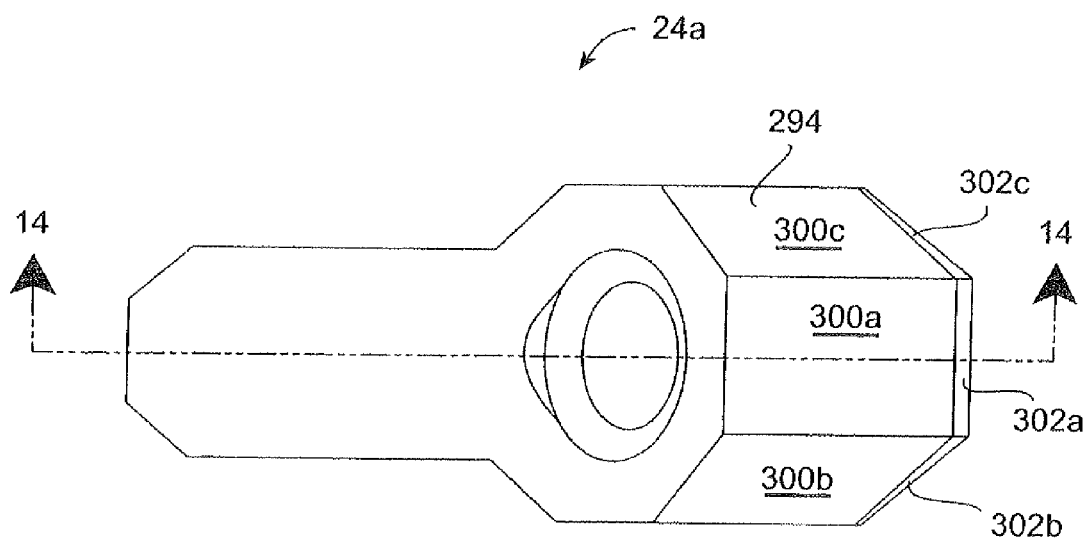
FIG. 12 is an elevational view of the depth stop of FIG. 10.

The depth stop 24 is mounted to the blade 22. A first embodiment of the depth stop 24 is shown in FIGS. 7-9. The depth stop 24 has a distal end 74 and a proximal end 76. The depth stop 24 includes a main body 78, an abutment portion 80 (see FIG. 9) extending from the main body 78 and a retention ear 82 extending from the abutment portion 80. The main body 78, the abutment portion 80 and the retention ear 82 are integrally formed.

The main body 78 includes a generally planar portion 84 and an enlarged end portion 86. The planar portion 84 includes an outer surface 88, an alignment surface 90 opposite the outer surface 88, and a peripheral edge 92 extending between the outer surface 88 and the alignment surface 90. The peripheral edge 92 is generally rounded at the proximal end 76 of the depth stop 24.

The enlarged end portion 86 extends from the planar portion 84 and is formed from a generally tubularly-shaped wall 94 generally having an interior surface 98, an exterior surface 97, and an alignment surface 96. The alignment surface 96 of the end portion 86 and the alignment surface 90 of the planar portion 84 of the main body 78 are co-planar. A rounded end surface 102 is provided at the distal end of the enlarged end portion 86 and extends from the exterior surface 97 to the alignment surface 96. The rounded surface 102 minimized friction between the depth stop 24 and the workpiece, thereby extending the life of the depth stop 24. The tubularly-shaped wall 94 defines a locking member passageway 104 having an entry opening 106 and an exit opening 108. A central axis 110 of the locking member passageway 104 is provided at an angle of approximately 40 degrees relative to the alignment surfaces 90, 96. A locking member 112 (FIGS. 3-5) is positioned within the locking member passageway 104 to secure the depth stop 24 to the hole saw 20. Preferably the locking member 112 is a set screw and the locking member passageway 104 includes a countersink 114 which receives the head of the locking member 112 as will be described herein. Preferably, the interior surface 98 includes a ¼-28 UNF internal thread. The exterior surface 97 of the wall 94 is parallel to the axis 110 of the locking member passageway 104.

Figure 3:
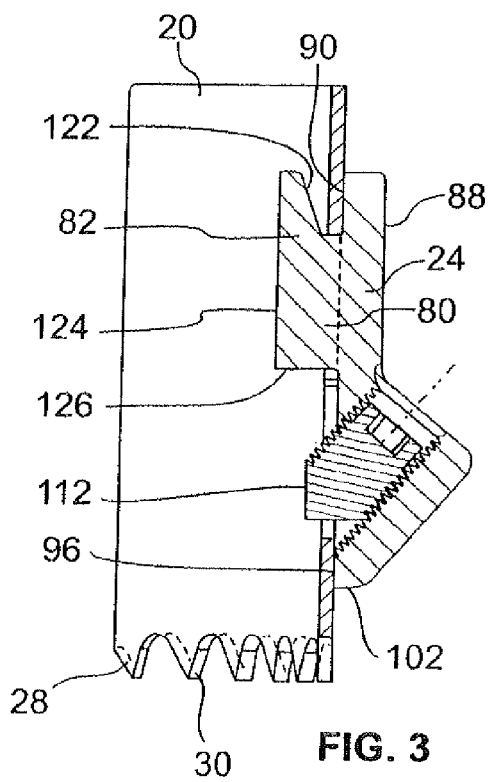
FIG. 3 is a cross-sectional view taken along line 3-3 of FIG. 2.
Figure 15:
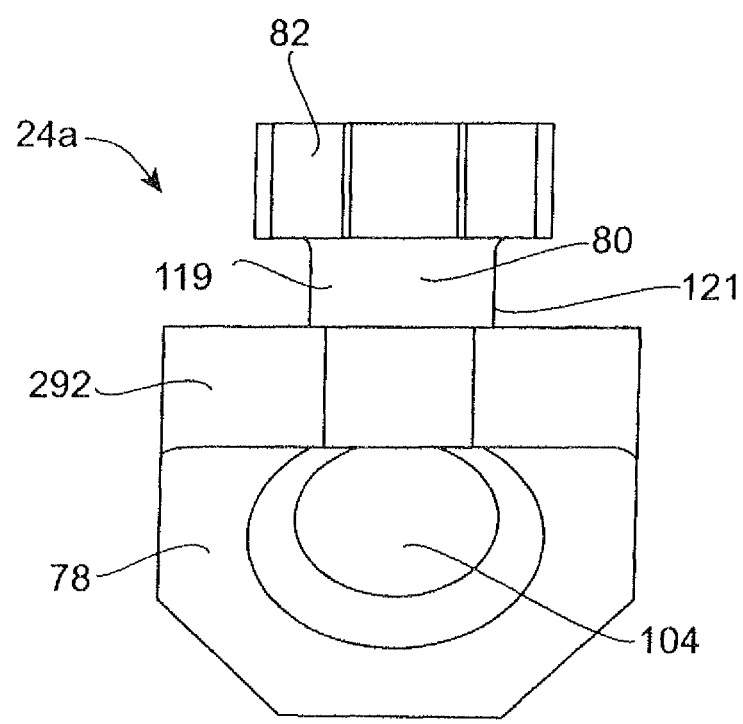
FIG. 15 is an elevational view of the depth stop of FIG. 10.

As best shown in FIGS. 3 and 9, the abutment portion 80 includes first and second side surfaces 119, 121, a proximal end surface 118 generally perpendicular to the first and second side surfaces 119, 121 (FIGS. 13 and 15), and a distal end surface 120 generally parallel to the proximal end surface 118. The abutment portion 80 extends generally perpendicular to the planar portion 84 of the main body 78 a distance approximately equal to the thickness of the flat stock 32 used to form the blade 22. The abutment portion 80 is narrower than the planar portion 84 and the retention ear 82 and is dimensioned so that the abutment portion 80 can be positioned within the second portion 42 of slot 38 in the blade 22.

The retention ear 82 is generally planar and extends from the abutment portion 80. The retention ear 82 includes an extension 128 extending proximally of the abutment portion 80. Shoulders 129 (FIG. 7) are provided by the extension 128 and the remainder of the retention ear 82. The retention ear 82 includes an alignment surface 122 and an interior surface 124. The alignment surface 122 of the retention ear 82 is angled relative to the alignment surfaces 90, 96 of the main body 78 and thus provides a generally tapered retention ear 82. A distal end surface 126 of the retention ear 82 is generally planar with the distal end surface 120 of the abutment portion 80. As best shown in FIG. 9, a notch 130 is defined by the alignment surface 90 of the planar portion 84 of the main body 78, the proximal end surface 118 of the abutment portion 80 and the alignment surface 96 of the retention ear 82 at the extension 128. The retention ear 82 is appropriately sized so that the retention ear 82 can pass through the first portion 40 of one of the slots 38 of the blade 22 as will be described herein.

A second embodiment of the depth stop 24a is shown in FIGS. 10-15. The depth stop 24a is similar to the depth stop 24 shown in FIGS. 7-9 with the following exceptions. Elements of depth stop 24a which are similar to elements of depth stop 24 are not described again herein and have been identified with the same reference numerals.

Unlike the peripheral edge 92 of the depth stop 24 which is rounded, the peripheral edge 292 of the planar portion 84 of the depth stop 24a is faceted at the proximal end.

The enlarged end portion 86 of depth stop 24a includes a wall 294 which defines the locking member passageway 104. Unlike the exterior surface of the wall 94 of depth stop 24 which is generally smooth and rounded, the exterior surface of the wall 294 of the depth stop 24a is faceted and includes a plurality of planar surfaces 300a, 300b, 300c, 300d, 300e. Each surface 300a, 300b, 300c, 300d, 300e generally extends parallel to the central axis 110 of the locking member passageway 104. The depth stop 24a also includes a faceted end surface 302. Unlike the end surface 102 of the depth stop 24 which is generally rounded, the end surface 302 of the depth stop 24a includes a plurality of flats 302a, 302b, 302c. The flats 302a, 302b, 302c extend from the planar surfaces 300a, 300b, 300c, 300d, 300e to the alignment surface 96 of the enlarged end portion 86. Each flat 302a, 302b, 302c is aligned with a corresponding surface 300a, 300b, 300c of the wall 294. Each flat 302a, 302b, 302e is provided at an angle of approximately eighty degrees (80°) relative to the alignment surface 96 of the end portion 86. A centrally-positioned end surface 302a is provided at the distal end 74 of the depth stop 24a.

The depth stop 24a is preferably formed using a powdered metal process and the faceted surfaces 292, 300a, 300b, 300c, 300d, 300e, 302a, 302b, 302c aid in the manufacturing process.

Figure 13:
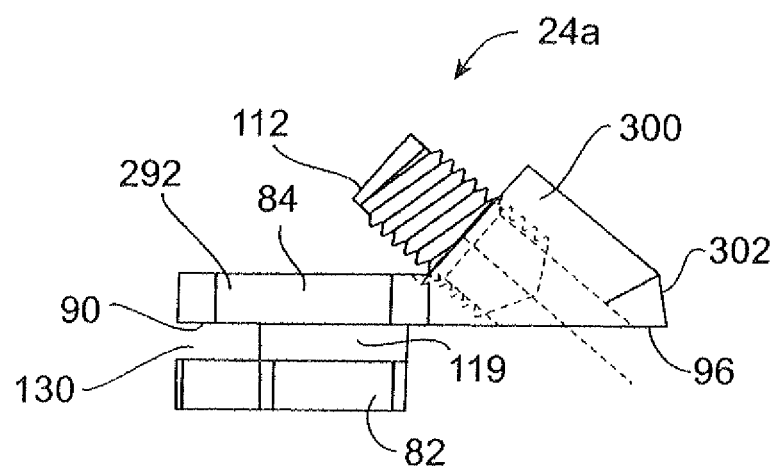
FIG. 13 is an elevational view of the depth stop of FIG. 10 with a locking member shown in phantom line set therein.
Figure 14:
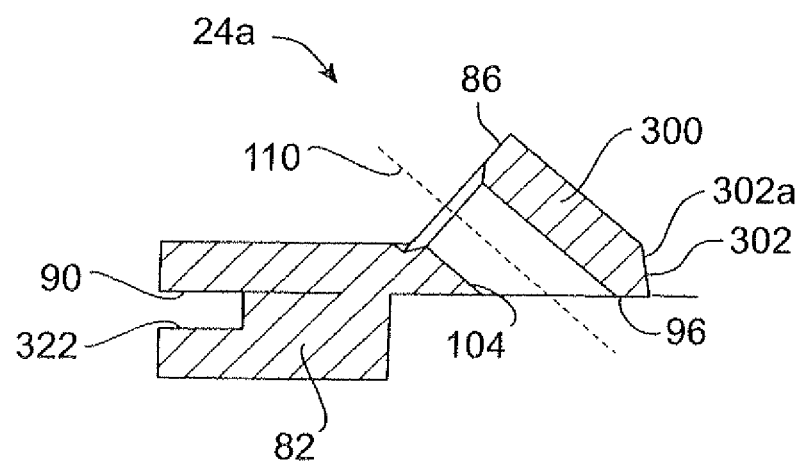
FIG. 14 is a cross-sectional view along line 14-14 of FIG. 12.

Finally, as best shown in FIGS. 13 and 14, unlike the retention ear 82 of the depth stop 24 which is tapered, the retention ear 82 of the depth stop 24a is not tapered. Thus, the abutment surface 322 of the retention ear 82 of the depth stop 24a is generally parallel to the alignment surfaces 90, 96 of the main body 78. It is to be understood that the retention ear 82 of the depth stop 24a may be tapered.

Figure 4:
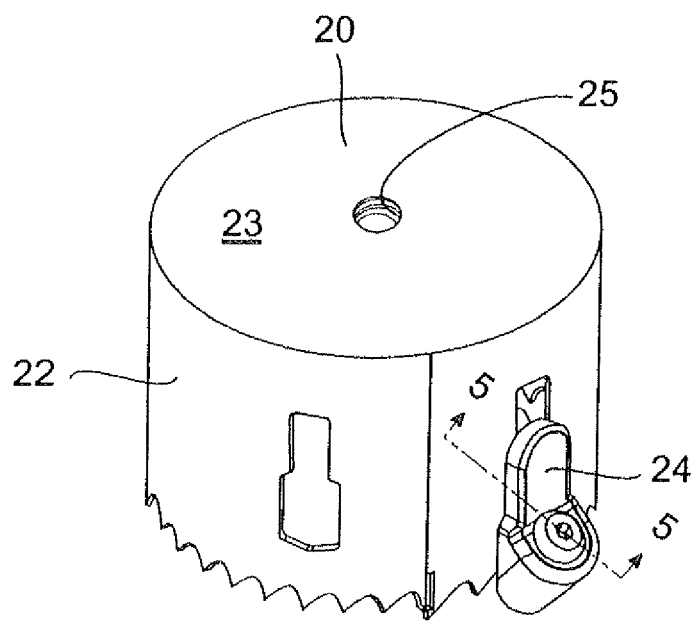
FIG. 4 is a perspective view of the hole saw with the depth stop mounted therein in an unsecured position.
Figure 5:
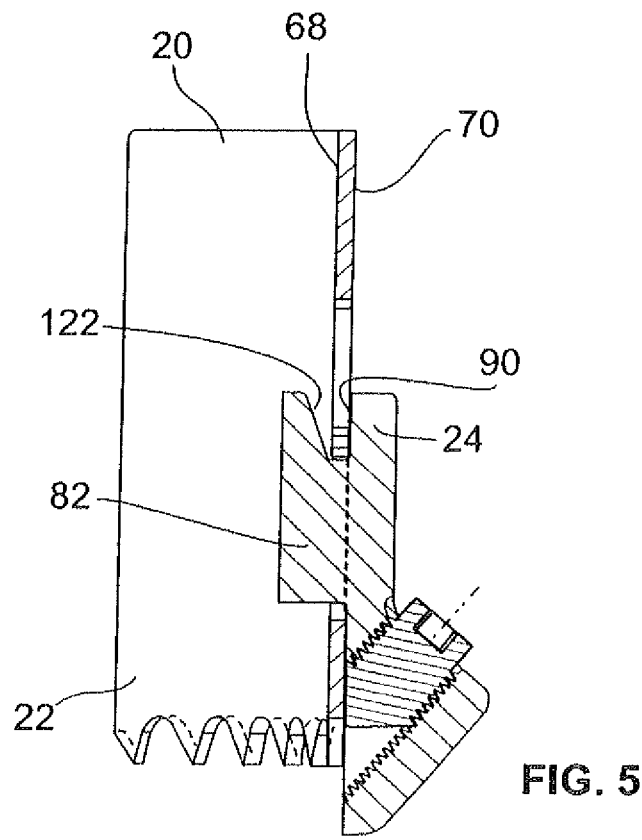
FIG. 5 is a cross-sectional view of the hole saw along line 5-5 in FIG. 4.

Assembly of the depth stop 24 or 24a with the blade 22 is accomplished in the same manner. Assembly of the depth stop 24 with the blade 22 is shown and described herein. Prior to mounting the depth stop 24, the user ensures that the locking member 112 is in a retracted position to ensure that the locking member 112 does not interfere with the blade 22 and prevent mounting of the depth stop 24. As shown in FIGS. 4 and 5, the depth stop 24 is mounted to the blade 22 by positioning the depth stop 24 proximate the exterior surface 70 of the blade 22 and aligning the retention ear 82 with the first portion 40 of one of the slots 38 in the blade 22. The retention ear 82 of the depth stop 24 is then passed through the first portion 40 of the slot 38 until the alignment surface 90 of the main body 78 abuts the exterior surface 70 of the blade 22 and the abutment portion 80 is positioned within the first portion 40 of the slot 38. With the retention ear 82 passed through the slot 38, the abutment portion 80 is generally co-planar with the portions of the blade 22 immediately surrounding the slot 38. The depth stop 24 is then slid in the proximal direction relative to the blade 22 to a secured position. The angled surface 122 of the retention ear 82 eases the sliding motion of the retention ear 82 of the depth stop 24 relative to the blade 22.

As shown in FIGS. 1-3, in the secured position, the abutment portion 80 of the depth stop 24 is positioned in the second smaller portion 42 of the slot 38 such that the first and second side surfaces of the abutment portion 80 are proximate the third and fourth side walls 58, 60 of the slot 38 and the proximal end surface 118 of the abutment portion 80 abuts the proximal end wall 62 of the slot 38. Due to the angle of the alignment surface 122 of the retention ear 82, a gap is provided between the inner surface 68 of the blade 22 and the alignment surface 122.

Next, the locking member 112, preferably a screw, is rotated until the tip of the locking member 112 extends through the exit opening 108 of the locking member passageway 104 and extends beyond the alignment surface 96 of the main body 78 of the depth stop 24. The angle between the central axis 110 of the locking member passageway 104 and the main body 78 of the depth stop 24 provides the user with easy access to the locking member 112. The tip of the locking member 112 provides an included angle which matches the included angle provided by the first and second segments 46, 48 of the distal end wall 44 of the slot 38. As the locking member 112 is rotated further, the tip of the locking member 112 engages the first and second segments 46, 48 of the distal end wall 44 of the slot 38 to secure the depth stop 24 in the secured position. The angled relationship between the locking member passageway 104 and the blade 22 allows the user to easily access the locking member 112 for moving the locking member between secured and unsecured positions. In this secured position, the depth stop 24 is constrained in all directions. The depth stop 24 is constrained in the proximal and distal directions through engagement of the proximal end surface 118 of abutment portion 80 of the depth stop 24 with the proximal end wall 62 of the slot 38 of the blade 22 and by engagement of the locking member 112 with the distal end wall 44 of the slot 38. The depth stop 24 is constrained in a side to side direction in part through engagement of the first and second side surfaces 119 of the abutment portion 80 of the depth stop 24 with the third and fourth side walls 58, 60 of the slot 38 of the blade 22.

Figure 16:
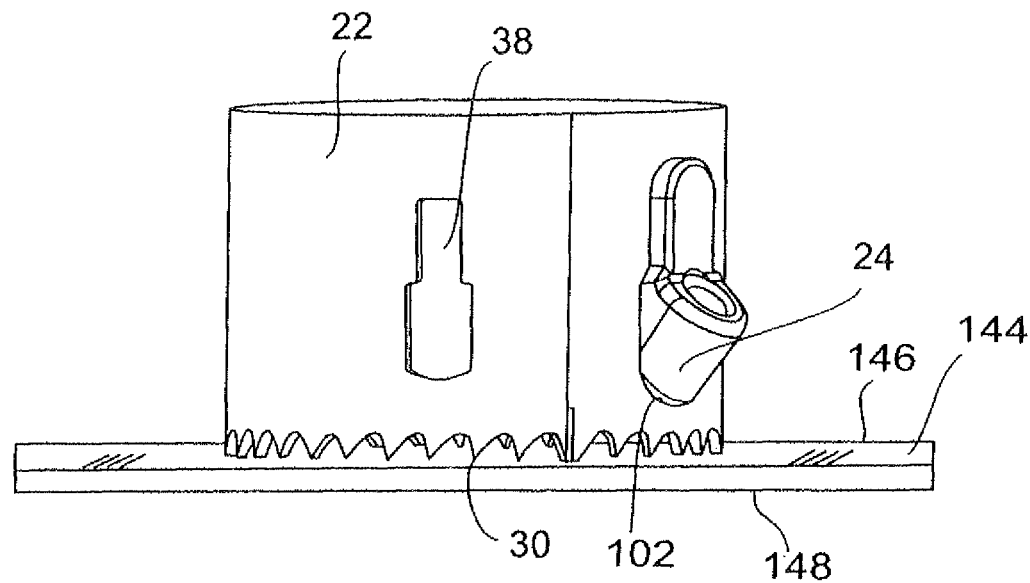
FIG. 16 is a perspective view of the hole saw with the depth stop of FIGS. 7-9 mounted therein, relative to a workpiece in an initial cutting stage.
Figure 17:
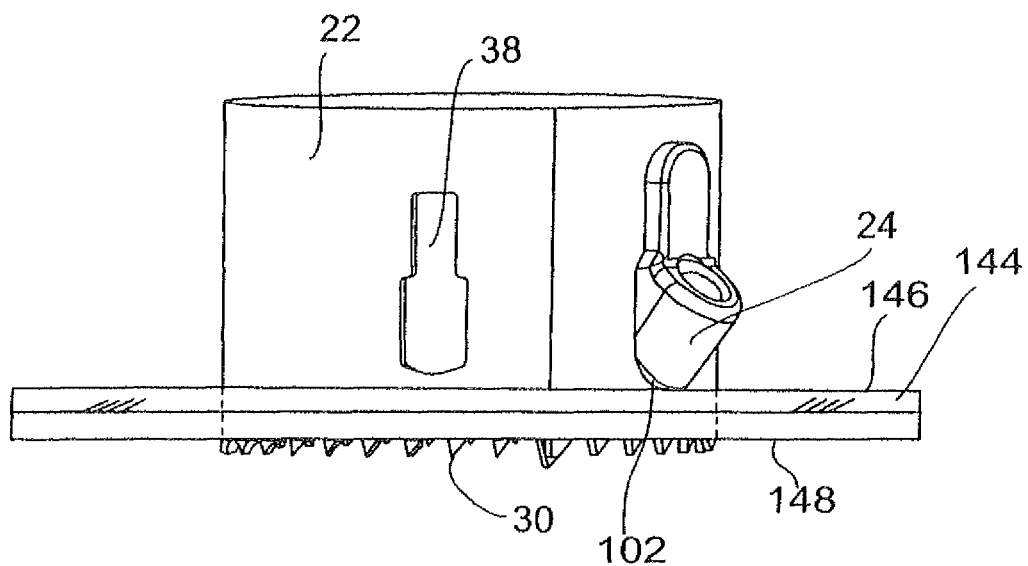
FIG. 17 is a perspective view of the hole saw with the depth stop of FIGS. 7-9 mounted therein, relative to a workpiece at a final cutting stage.

The depth stops 24, 24a are used in the same manner. As shown in FIGS. 16 and 17 the hole saw 20 with the depth stop 24 is used to a cut hole through a workpiece 144 having a proximal surface 146 and a distal surface 148. As shown in FIG. 16, as the blade 22 is rotated, the teeth 30 engage the workpiece 144 to be cut. As shown in FIG. 17, upon further rotation and penetration of the blade 22 through the workpiece 144, the end wall 102 of the depth stop 24 contacts a proximal surface 146 of the workpiece 144 preventing further penetration of the blade 22 into the workpiece 144. Preferably, the slots 38 of the blade 22 and the depth stop 24 are dimensioned and configured to limit the teeth 30 of the blade 22 from extending more than a quarter of an inch past the distal surface 146 of the workpiece 144. By limiting the depth of the penetration, cutting of wires in an electrical box, for example, can be avoided.

Upon completion of cutting, if a slug is lodged in blade 22, a tool can be inserted in one of the remaining available slots 38 to remove the slug from the blade 22. Furthermore, if the user does not wish to limit the depth of the next hole to be cut, the depth stop 24 can be easily removed from the blade 22 by reversing the steps taken to attach the depth stop 24 to the blade 22. Alternatively, if the user chooses to cut a hole of a different diameter, the depth stop 24 can be removed from the blade 22 and attached to a blade with the alternate diameter.

As shown and described, the depth stop 24, 24a can be easily mounted to and dismounted from the blade 22 of the hole saw 20. The ease with which the depth stop 24, 24a can be mounted and dismounted provides the user the ability of mounting the depth stop 24, 24a when the depth of penetration is to be limited and quickly and easily removing the depth stop 24, 24a when deeper penetration is desired. In addition, the same depth stop 24, 24a can be used in connection with hole saws having varying diameters, significantly reducing the complexity and cost of the overall hole saw assembly 20. Finally, additional slots 38 allow for easy removal of the slug from the blade 22.

While a plurality of slots 38 are shown, it is to be understood that only a single slot 38 is necessary for the present invention to function.

A third embodiment of a hole saw 320 is shown assembled with a depth stop 324 in FIGS. 18-26. For ease of description, the surfaces and elements of the hole saw 320 which are positioned closest to the user when the hole saw 320 is in use are referred to as proximal, and surfaces and elements furthest from the user are referred to as distal.

The hole saw 320 includes a blade 322 and a backplate 323 which are permanently affixed together such as by welding as is known in the art. A mounting aperture 325, for example, is provided for mounting the hole saw 320 to a driving mechanism, such as an electric hand drill (not shown), for drilling a hole through a workpiece as will be described herein.

Figure 24:
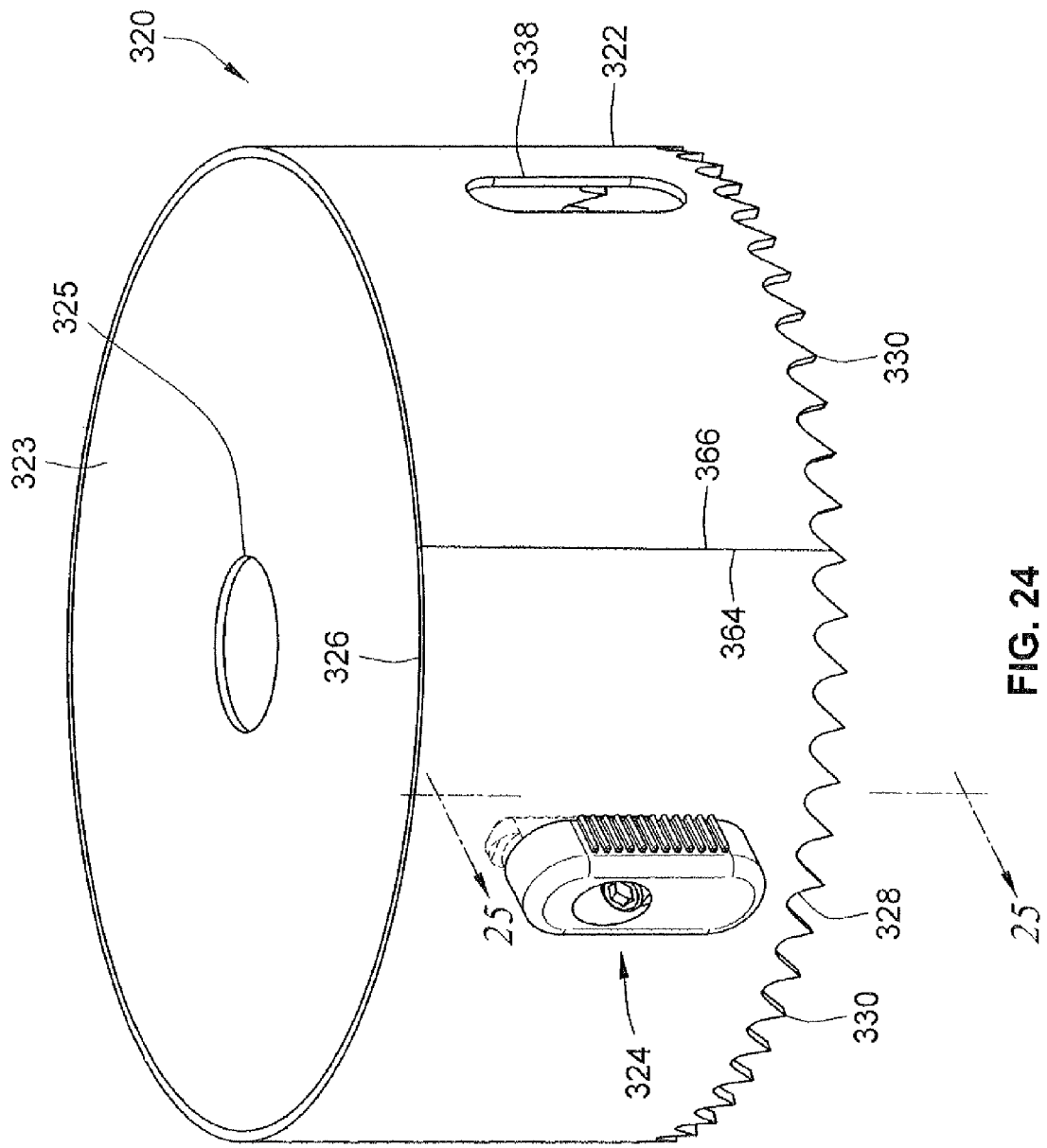
FIG. 24 is a perspective view of the hole saw with the depth stop of FIG. 18 mounted therein.

The blade 322 is generally tubularly-shaped and includes a circularly-shaped proximal edge 326, shown in FIG. 24, which is mounted to the back plate 323. The blade 322 also includes a generally circularly-shaped distal edge 328 having cutting teeth 330.

Figure 19:
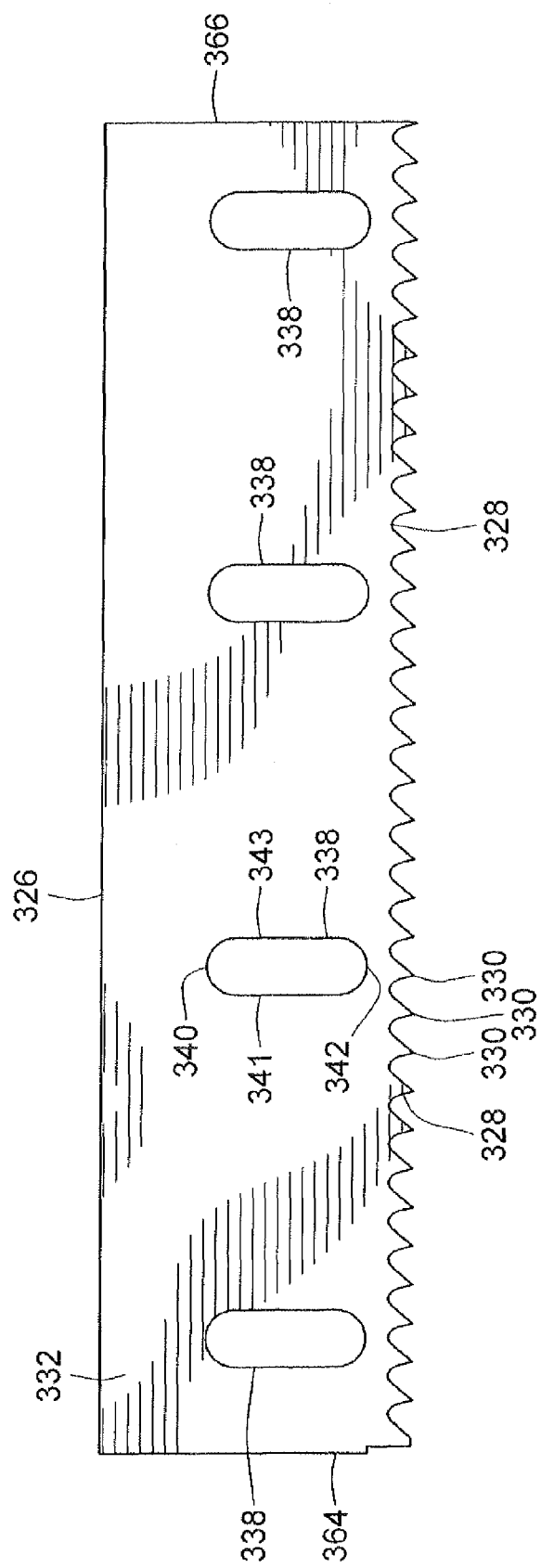
FIG. 19 is an elevational view of the stamped material from which the blade of the hole saw used with the third embodiment is formed.
Figure 20:
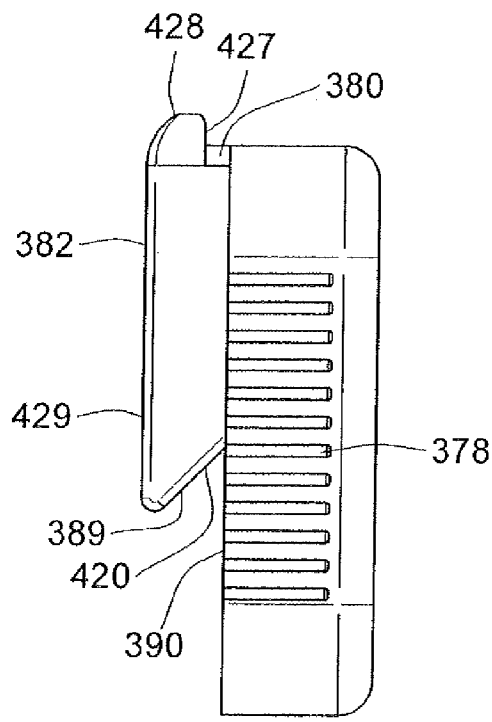
FIGS. 20-22 are elevational views of the depth stop of FIG. 18.
Figure 21:
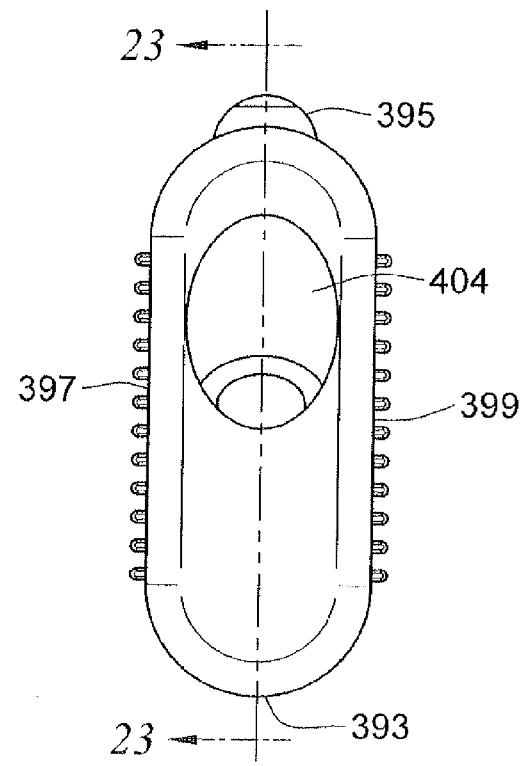
Figure 22:
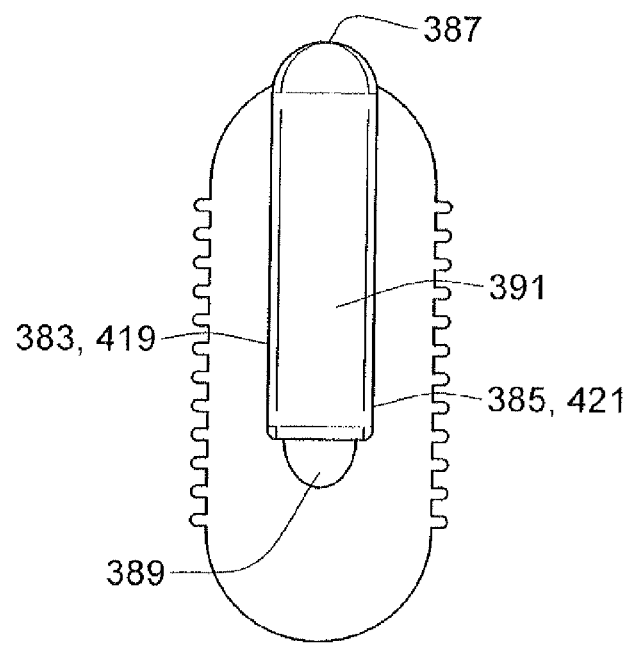

As shown in FIG. 19, the blade 322 is formed from a piece of flat stock 332 like that shown in the previous embodiments. The flat stock 332 provides the distal edge 328 along with the teeth 330 of the blade 322, and the linear proximal edge 326. Identically formed slots 338 are provided through the flat stock 332 and at spaced apart locations. As shown, four identically formed slots 338 are equi-distantly positioned along the length of the flat stock 332. Each slot 338 is oval in shape as is known in the prior art. Accordingly, each slot 338 includes a proximal arcuate edge 340 spaced from the proximal edge 326 of the blade 322 and a distal arcuate edge 342 spaced from the distal edge 328 of the blade 322 and straight side edges 341, 343 which connect the proximal and distal arcuate edges 340, 342 together. The edges 326, 328 of the blade 322 are not interrupted by the slots 338.

To form the tubularly-shaped blade 322, opposite ends 364, 366 of the flat stock 332 are welded together providing an interior surface 368 and an exterior surface 370. Prior to welding opposite ends 364, 366, the slots 338 and the teeth 330 of the blade 322 are formed on the flat stock 332 preferably using a die and punch but can also be formed by any other means commonly known in the art.

The depth stop 324 is mounted to the blade 322 in one of two positions. The depth stop 324 has a first end 374 and a second end 376. As best shown in FIGS. 20-23, the depth stop 324 includes a main body 378, an abutment portion 380 extending from the main body 378 and a retention ear 382 extending from the abutment portion 380. The main body 378, the abutment portion 380 and the retention ear 382 are integrally formed.

The main body 378 includes an oval-shaped outer surface 388, an alignment surface 390 opposite the outer surface 388, and a peripheral edge 392 extending between the outer surface 388 and the alignment surface 390. The peripheral edge 392 is oval-shaped and includes a first arcuate edge 393 and a second arcuate edge 395 with straight side edges 397, 399 connecting the first and second arcuate edges 393, 395 together. The straight side edges 397, 399 may include finger ridges as shown to aid in a user gripping the depth stop 324.

Figures 18, 23:
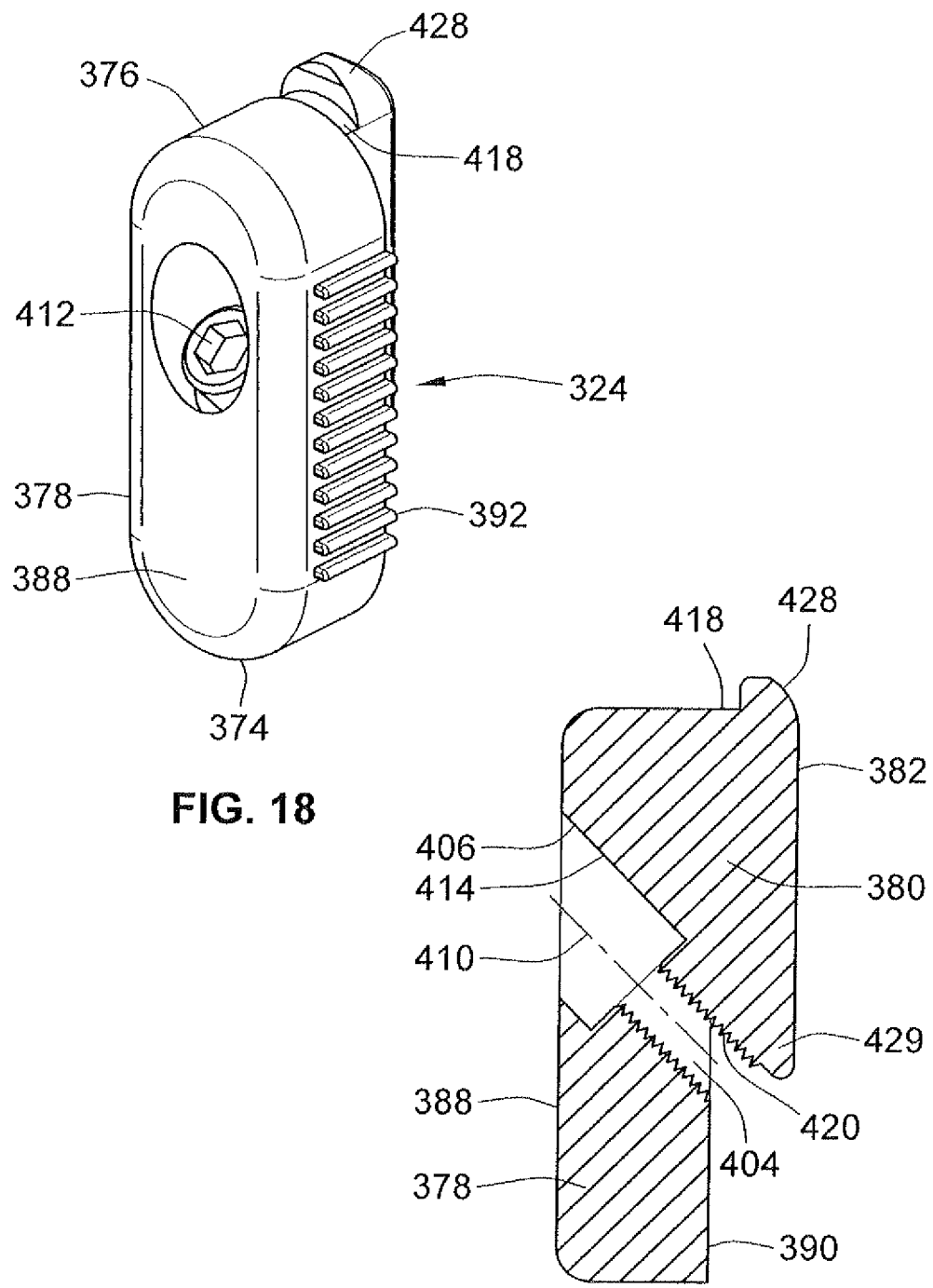
FIG. 18 is a perspective view of the depth stop which incorporates the features of a third embodiment of the invention.
FIG. 23 is a cross-sectional view along line 23-23 of FIG. 21.

As best shown in FIG. 23, a locking member passageway 404 is formed by a wall having an entry opening 406 and an exit opening 408 is provided through the main body 378. A central axis 410 of the locking member passageway 404 is provided at an angle of approximately 40 degrees relative to the alignment surface 490. A locking member 412 (FIGS. 25 and 26) is positioned within the locking member passageway 404 to secure the depth stop 324 to the hole saw 320 into one of two positions. Preferably, the locking member 412 is a cup point set screw and the locking member passageway 404 includes a countersink 414 which receives the head of the locking member 412 as will be described herein. Preferably, the interior surface of the locking member passageway 404 includes a ¼-28 UNF internal thread. The angle of the threads of the locking member 412 allows the threads to catch the edge 340, 342 of the slot 338 (tangent) in the blade 322. Therefore, no special shape or slot form required for this second embodiment. The head of the locking member 412 can be provided with a hexagonal recess, as shown, or a slotted recess.

The locking member passageway 404 divides the main body 378 into a first portion 378a and a second portion 378b. The first portion 378a extends from the first arcuate edge 393 to the locking member passageway 404, and second portion 378b extends from the second arcuate edge 395 to the locking member passageway 404.

The abutment portion 380 is generally oval-shaped and includes first and second straight side surfaces 419, 421, a first arcuate end surface 418, and a second arcuate end surface 420. The abutment portion 380 extends from first portion 378a of the main body 378 a distance approximately equal to the thickness of the flat stock 332 used to form the blade 322. The abutment portion 380 is narrower than the main body 378 and is dimensioned so that the abutment portion 380 can be positioned within the slot 338 in the blade 322. The distal arcuate end surface 420 also tapers and is aligned with the wall that forms the locking member passageway 404.

The retention ear 382 is generally planar and extends from the abutment portion 380. The retention ear 382 is generally oval-shaped and includes first and second straight side surfaces 383, 385, a first arcuate end surface 387, and a distal arcuate end surface 389. The retention ear 382 terminates in an end surface 391 which is oval-shaped. The first side surface 383 is coplanar with the side surface 419 of the abutment portion 380; the second side surface 385 is coplanar with the side surface 421 of the abutment portion 380. The retention ear 382 includes a first extension 428 extending beyond the abutment portion 380 and a distal extension 429 extending beyond the abutment portion 380, such that the end surface 383 is larger than the abutment portion 380. The first extension 428 has a surface 427 which is planar and extends generally perpendicular to the abutment portion 380. The distal arcuate end surface 389 tapers from the abutment portion 380 to the end surface 383 and is aligned with the wall that forms the locking member passageway 404 and the distal arcuate end surface 420 of the abutment portion 380. The retention ear 382 is appropriately sized so that the retention ear 382 can pass through one of the slots 338 of the blade 322 as will be described herein.

Figure 25:
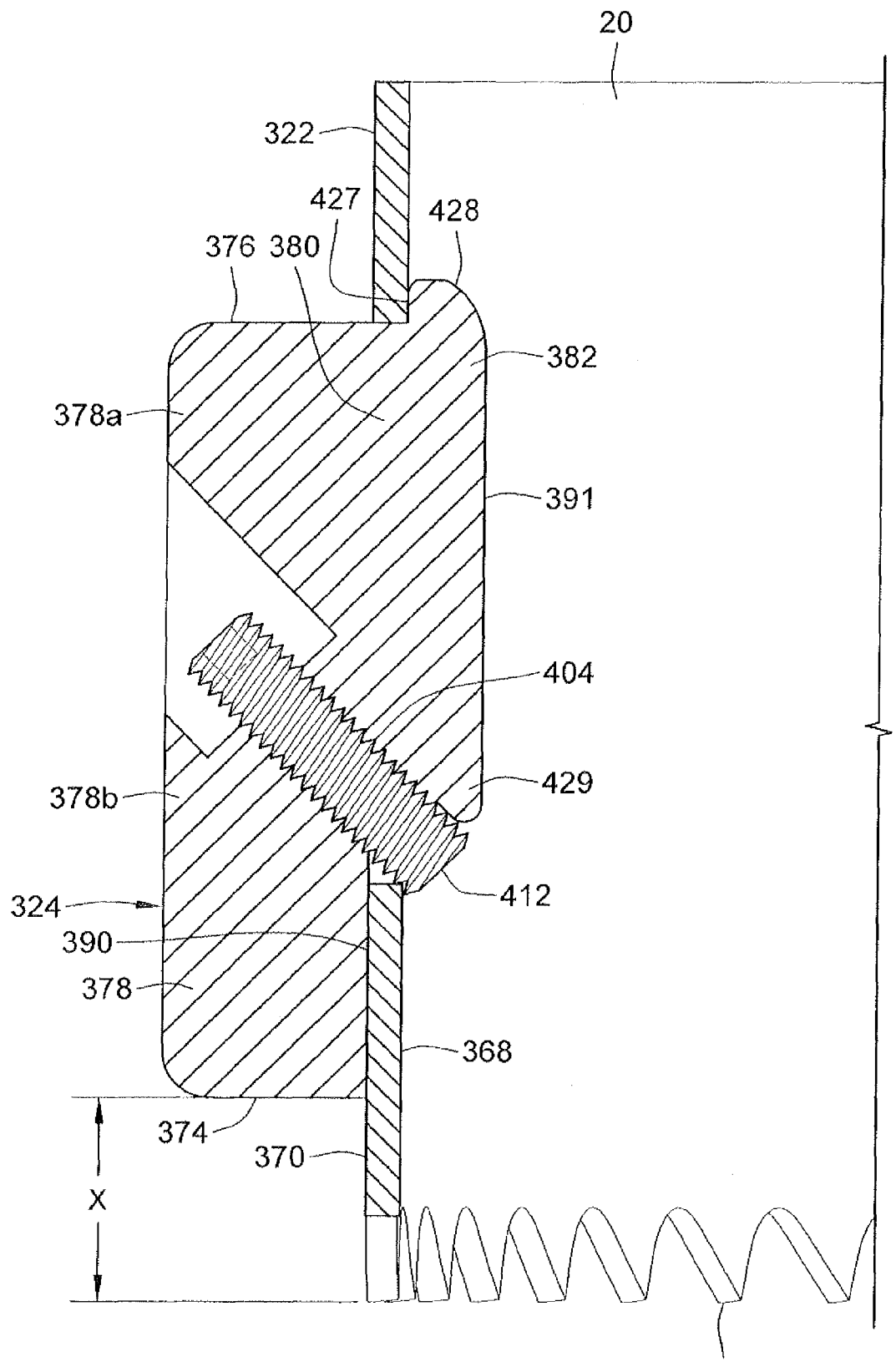
FIG. 25 is a cross-sectional view taken along line 25-25 of FIG. 24 in which the depth stop is positioned in a first position on the hole saw.

Prior to mounting the depth stop 324, the user ensures that the locking member 412 is in a retracted position to ensure that the locking member 412 does not interfere with the blade 322 and prevent mounting of the depth stop 324. In a first position as shown in FIG. 25, the depth stop 324 is mounted to the blade 322 by positioning the depth stop 324 proximate the exterior surface 370 of the blade 322 and aligning the retention ear 382 with the one of the slots 338 in the blade 322 such that the first extension 428 is proximate to the proximal arcuate edge 340 of the blade 322. The retention ear 382 is then passed through the slot 338 until the alignment surface 390 of the main body 378 abuts the exterior surface 370 of the blade 322 and the abutment portion 380 is positioned within the slot 338. With the retention ear 382 passed through the slot 338, the abutment portion 380 is generally co-planar with the portions of the blade 322 immediately surrounding the slot 338. The depth stop 324 is then slid in the proximal direction relative to the blade 322 until the surface 427 of the first extension 428 of the retention ear 382 engages the interior surface 368 of the blade 322 and the first arcuate end surface 418 of the abutment portion 380 abuts the proximal arcuate end 340 of the slot 338. The abutment portion 380 is dimensioned such that the first and second side surfaces 419, 421 generally abut against the straight side walls 341, 343 of the slot 338.

Next, the locking member 412, preferably a screw, is rotated until the tip of the locking member 412 extends through the exit opening 408 of the locking member passageway 404 and extends beyond the alignment surface 390 of the main body 378 of the depth stop 324. The angle between the central axis 410 of the locking member passageway 404 and the main body 378 of the depth stop 324 provides the user with easy access to the locking member 412. As the locking member 412 is rotated further, the tip of the locking member 412 engages the distal arcuate edge 342 of the slot 338 to secure the depth stop 324 in the secured position. The angled relationship between the locking member passageway 404 and the blade 322 allows the user to easily access the locking member 412 for moving the locking member 412 between secured and unsecured positions. In this secured position, the depth stop 324 is constrained in all directions. The depth stop 324 is constrained in the proximal and distal directions through engagement of the first end surface 318 of abutment portion 380 of the depth stop 324 with the proximal arcuate edge 340 of the slot 338 and by engagement of the locking member 412 with the distal arcuate edge 342 of the slot 338. The depth stop 324 is constrained in a side to side direction through engagement of the first and second side surfaces 421, 419 of the abutment portion 380 of the depth stop 324 with the side walls 341, 343 of the slot 338.

In this first position, the second portion 378b of the main body 378 extends distally of the locking member passageway 404. As a result, a predetermined distance between the teeth 330 of the blade 322 and the first end 374 of the depth stop 324 is provided by the distance X.

Figure 26:
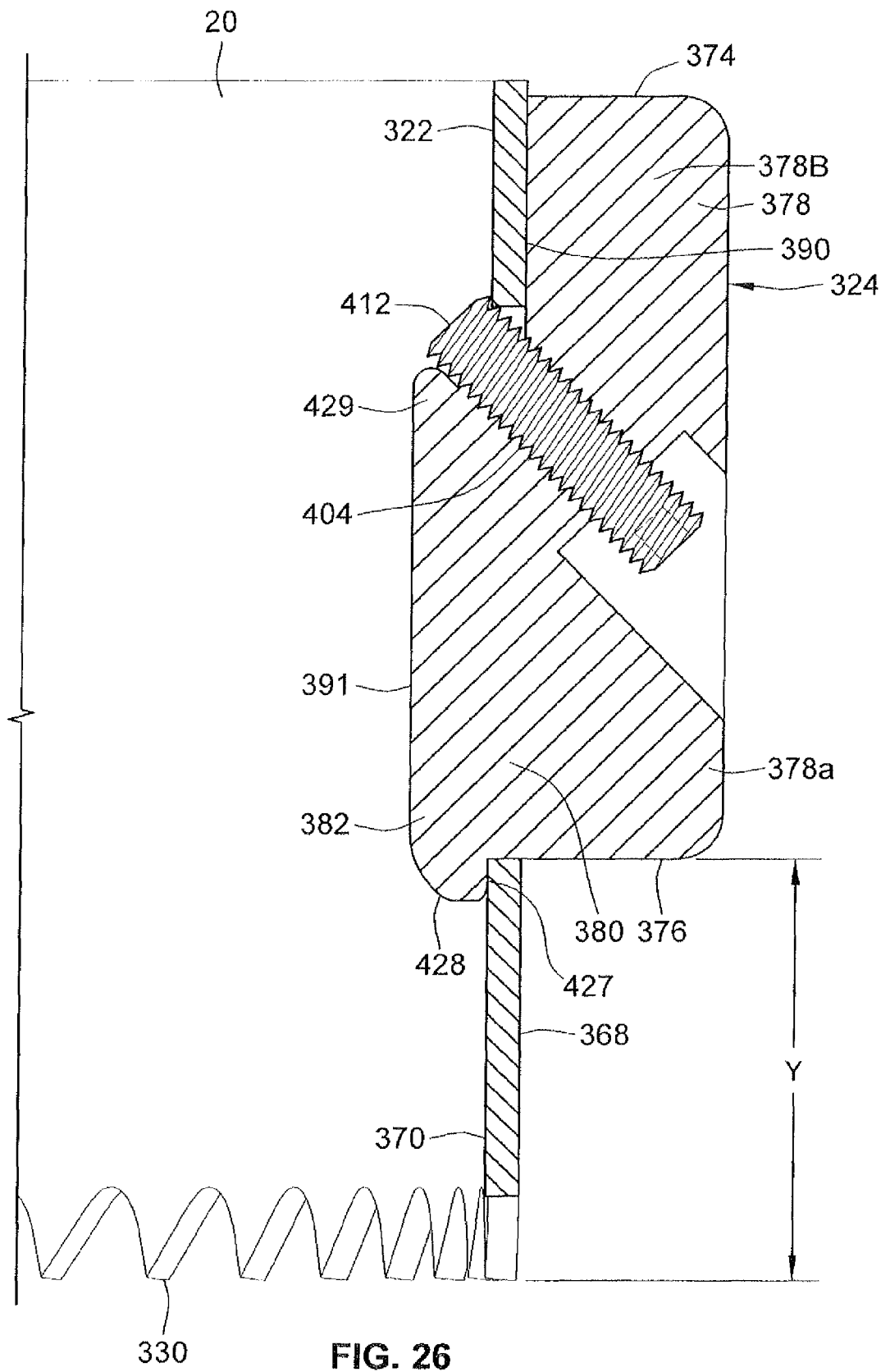
FIG. 26 is a cross-sectional view in which the depth stop is positioned in a second position on the hole saw.

If desired, the depth stop 324 can be rotated 180 degrees to mount the depth stop 324 in the opposite direction. Again, prior to mounting the depth stop 324, the user ensures that the locking member 412 is in a retracted position to ensure that the locking member 412 does not interfere with the blade 322 and prevent mounting of the depth stop 324. In this second position as shown in FIG. 26, the depth stop 324 is mounted to the blade 322 by positioning the depth stop 324 proximate the exterior surface 370 of the blade 322 and aligning the retention ear 382 with the one of the slots 338 in the blade 322 such that the first extension 428 is proximate to the distal arcuate edge 342 of the blade 322. The retention ear 382 is then passed through the slot 338 until the alignment surface 390 of the main body 378 abuts the exterior surface 370 of the blade 322 and the abutment portion 380 is positioned within the slot 338. With the retention ear 382 passed through the slot 338, the abutment portion 380 is generally co-planar with the portions of the blade 322 immediately surrounding the slot 338. The depth stop 324 is then slid in the distal direction relative to the blade 322 until the surface 427 of the first extension 428 of the retention ear 382 engages the interior surface 368 of the blade 322 and the first arcuate end surface 418 of the abutment portion 380 abuts the distal arcuate end 342 of the slot 338.

Next, the locking member 412, preferably a screw, is rotated until the tip of the locking member 412 extends through the exit opening 408 of the locking member passageway 404 and extends beyond the alignment surface 390 of the main body 378 of the depth stop 324. The angle between the central axis 410 of the locking member passageway 404 and the main body 378 of the depth stop 324 provides the user with easy access to the locking member 412. As the locking member 412 is rotated further, the tip of the locking member 412 engages the proximal arcuate edge 340 of the slot 338 to secure the depth stop 324 in the secured position. The angled relationship between the locking member passageway 404 and the blade 322 allows the user to easily access the locking member 412 for moving the locking member 412 between secured and unsecured positions. In this secured position, the depth stop 324 is constrained in all directions. The depth stop 324 is constrained in the proximal and distal directions through engagement of the first end surface 318 of abutment portion 380 of the depth stop 324 with the distal arcuate edge 342 of the slot 338 and by engagement of the locking member 412 with the proximal arcuate edge 340 of the slot 338. The depth stop 324 is constrained in a side to side direction through engagement of the first and second side surfaces 421, 419 of the abutment portion 380 of the depth stop 324 with the side walls 341, 343 of the slot 338.

In this second position, the second portion 378b of the main body 378 extends proximally of the locking member passageway 404. As a result, a predetermined distance between the teeth 330 of the blade 322 and the second end 376 of the depth stop 324 is provided by the distance Y.

The hole saw 320 with the depth stop 324 (in one of the two positions) is used to cut a hole through a workpiece having a proximal surface and a distal surface. As the blade 322 is rotated, the teeth 330 engage the workpiece to be cut. Upon further rotation and penetration of the blade 322 through the workpiece, the first end 374 of the depth stop 324 contacts a proximal surface of the workpiece (if the depth stop is positioned as provided in FIG. 25) or the second end 376 of the depth stop 324 contacts a proximal surface of the workpiece (if the depth stop is positioned as provided in FIG. 26), preventing further penetration of the blade 322 into the workpiece. Preferably, the slots 338 of the blade 322 and the depth stop 324 are dimensioned and configured to limit the teeth 330 of the blade 322 from extending more than a quarter of an inch past the distal surface of the workpiece. By limiting the depth of the penetration, cutting of wires in an electrical box, for example, can be avoided.

The distance X and the distance Y are different, thereby allowing for the depth stop 324 to be adjustable. The user can select between two depths of cut by flipping the depth stop 324 end to end and reinstalling it. As shown in FIG. 25, the depth stop 324 is positioned in the shallow position for metal panels and boxes approximately ¼", and as shown in FIG. 26, the depth stop 324 is positioned in the deeper position for plastic or composite approximately ½".

Upon completion of cutting, if a slug is lodged in blade 322, a tool can be inserted in one of the remaining available slots 338 to remove the slug from the blade 322. Furthermore, if the user does not wish to limit the depth of the next hole to be cut, the depth stop 324 can be easily removed from the blade 322 by reversing the steps taken to attach the depth stop 324 to the blade 322. Alternatively, if the user chooses to cut a hole of a different diameter, the depth stop 324 can be removed from the blade 322 and attached to a blade with the alternate diameter.

As shown and described, the depth stop 324 can be easily mounted to and dismounted from the blade 322 of the hole saw 320. The ease with which the depth stop 324 can be mounted and dismounted provides the user the ability of mounting the depth stop 324 when the depth of penetration is to be limited and quickly and easily removing the depth stop 324 when deeper penetration is desired. In addition, the same depth stop 324 can be used in connection with hole saws having varying diameters, significantly reducing the complexity and cost of the overall hole saw assembly 320. Finally, additional slots 338 allow for easy removal of the slug from the blade 322.

While a plurality of slots 338 are shown, it is to be understood that only a single slot 338 is necessary for the present invention to function.

In addition, this third embodiment of the depth stop 324 fits a small commonly-used oval slot 338 which does not compromise the strength of the blade 332. The depth stop 324 fits the entire range of sizes of hole saws 20 down to %16" diameter without interfering with the pilot drill bit. This third embodiment of the depth stop 324 has improved ergonomics, as it has been sized, shaped and textured to facilitate ease of handling and installation relative to first and second embodiments. In addition, the rounded form presents no sharp edges minimizing potential for injury relative to incidental contact with the depth stop 324. It is to be understood, however, that other shapes for the perimeter of the main body 378 can be provided.

While preferred embodiments of the present invention are shown and described, it is envisioned that those skilled in the art may devise various modifications of the present invention without departing from the spirit and scope of the appended claims.

The invention claimed is:

1. In combination, a hole saw and depth stop for forming a hole in a workpiece, comprising:
a backplate;
a blade extending from said backplate at an end of said blade, said blade having a plurality of teeth at an opposite end thereof, an interior surface, an exterior surface, and a slot extending through said blade from said interior surface to said exterior surface, said slot being spaced from said ends of said blade such that said ends of said blade are not interrupted by said slot, and a depth stop including a main body positioned proximate the exterior surface of said blade, and an abutment portion extending from said main body and positioned within said slot of said blade, and a retention ear extending from said abutment portion and positioned proximate said interior surface of said blade, said main body and said abutment portion being integrally formed, wherein in use, said main body engages the workpiece to limit penetration of said blade through the workpiece.

2. The combination as defined in claim 1, wherein said depth stop is removably attached to said blade.

3. In combination, a hole saw and depth stop for forming a hole in a workpiece, comprising:
a backplate;
a blade extending from said backplate at an end of said blade, said blade having a plurality of teeth at an opposite end thereof, an interior surface, an exterior surface, and a slot extending through said blade from said interior surface to said exterior surface, said slot being spaced from said ends of said blade such that said ends of said blade are not interrupted by said slot, and a depth stop including a main body positioned proximate the exterior surface of said blade and an abutment portion extending from said main body and positioned within said slot of said blade, said main body and said abutment portion being integrally formed, wherein in use, said main body engages the workpiece to limit penetration of said blade through the workpiece, said depth stop further includes a locking member passageway extending through said main body and a locking member positioned in said locking member passageway.

4. The combination as defined in claim 3, wherein an axis of said locking member passageway is provided at an angle of approximately forty degrees relative to a central axis of said blade.

5. The combination as defined in claim 3, wherein said depth stop is slidingly engaged with said slot from an unsecured position to a secured position, wherein in said secured position said depth stop abuts an end of said slot and said locking member abuts an opposite end of said slot.

6. The combination as defined in claim 1, wherein at least one end of said main body is rounded.

7. The combination as defined in claim 1, wherein opposite ends of said main body are rounded.

8. In combination, a hole saw and depth stop for forming a hole in a workpiece, comprising:
a backplate;
a blade extending from said backplate at an end of said blade, said blade having a plurality of teeth at an opposite end thereof, an interior surface, an exterior surface, and a slot extending through said blade from said interior surface to said exterior surface, said slot being spaced from said ends of said blade such that said ends of said blade are not interrupted by said slot, and a depth stop including a main body positioned proximate the exterior surface of said blade and an abutment portion extending from said main body and positioned within said slot of said blade, said main body and said abutment portion being integrally formed, an end of said main body includes a series of flats, wherein in use, said main body engages the workpiece to limit penetration of said blade through the workpiece.

9. In combination, a hole saw and depth stop for forming a hole in a workpiece, comprising:
a backplate;
a blade extending from said backplate at an end of said blade, said blade having a plurality of teeth at an opposite end thereof, an interior surface, an exterior surface, and a slot extending through said blade from said interior surface to said exterior surface, said slot being spaced from said ends of said blade such that said ends of said blade are not interrupted by said slot, said slot includes a first portion and a second portion, a width of said first portion is greater than a width of said second portion, and a depth stop including a main body positioned proximate the exterior surface of said blade and an abutment portion extending from said main body and positioned within said slot of said blade, said main body and said abutment portion being integrally formed, wherein in use, said main body engages the workpiece to limit penetration of said blade through the workpiece.

10. The combination as defined in claim 1, wherein said slot is oval-shaped.

11. The combination as defined in claim 1, wherein said blade includes a plurality of slots.

12. The combination as defined in claim 11, wherein said plurality of slots are identically formed.

13. The combination as defined in claim 1, wherein said main body, said abutment portion and said retention ear are integrally formed.

14. In combination, a hole saw and depth stop for forming a hole in a workpiece, comprising:
   a backplate;
   a blade extending from said backplate at an end of said blade, said blade having a plurality of teeth at an opposite end thereof, an interior surface, an exterior surface, and a slot extending through said blade from said interior surface to said exterior surface, said slot being spaced from said ends of said blade such that said ends of said blade are not interrupted by said slot, and a depth stop including a main body positioned proximate the exterior surface of said blade and an abutment portion extending from said main body and positioned within said slot of said blade, said main body and said abutment portion being integrally formed, said main body includes a plurality of ridges thereon, wherein in use, said main body engages the workpiece to limit penetration of said blade through the workpiece.

15. A depth stop for use in connection with a hole saw having a slot therethrough and for limiting the penetration of the hole saw through a workpiece, the depth stop comprising:
   a main body having opposite end surfaces and a locking member passageway therethrough;
   an abutment portion extending from said main body and through the slot in the hole saw;
   a locking member capable of being inserted into said locking member passageway and being moveable therein;
   said depth stop capable of being within the slot in an unsecured position wherein said depth stop can slide within said slot, said depth stop capable of moving to a secured position wherein said abutment portion abuts an end of said slot and said locking member abuts an opposite end of said slot upon moving said locking member within said main body, and wherein, in use, one of said end surfaces of said main body abuts the workpiece to limit penetration of the hole saw into the workpiece.

16. The depth stop as defined in claim 15, wherein said main body includes an alignment surface and said locking member passageway includes an exit opening co-planar with said alignment surface.

17. The depth stop as defined in claim 15, wherein said end surface of said main body which in use abuts the workpiece includes a series of flats.

18. The depth stop as defined in claim 15, wherein said end surface of said main body which in use abuts the workpiece is rounded.

19. The depth stop as defined in claim 15, wherein said end surfaces of said main body are rounded.

20. The depth stop as defined in claim 15, further including a retention ear extending from said abutment portion and positioned proximate said blade.

21. The depth stop as defined in claim 20, wherein an end of said retention ear is tapered.

22. The depth stop as defined in claim 15, wherein an axis of said locking member passageway is angled approximately forty degrees relative to a central axis of the hole saw.

23. The depth stop as defined in claim 15, further including a plurality of ridges provided on said main body.

24. The depth stop as defined in claim 15, wherein said depth stop is formed using a powdered metal process.

25. A method of attaching a depth stop to a hole saw used for forming a hole in a workpiece comprising:
   providing a hole saw having a backplate and a blade, said blade having opposite ends, an exterior surface, an interior surface, a plurality of teeth at one of said ends, a slot extending from said exterior surface to said interior surface and being spaced from said opposite ends such that said ends of said blade are not interrupted by said slot, said blade extending from said backplate at the other of said ends;
   providing a depth stop having a main body defining a locking member passageway, an abutment portion extending from said main body, and a locking member positioned within said locking member passageway, said locking member being moveable within said locking member passageway;
   positioning said abutment portion within said slot;
   sliding said depth stop within said slot so as to abut said abutment portion against an end of slot; and
   engaging said locking member through said locking member passageway until said locking member abuts an opposite end of said slot, wherein, in use, said main body abuts the workpiece to limit penetration of the hole saw into the workpiece.

26. The method of attaching a depth stop to a hole saw as defined in claim 25, wherein said depth stop further includes a retention ear extending from said abutment portion, and wherein prior to said step of positioning said abutment portion within said slot, said retention ear is passed through said slot and positioned proximate said interior surface of said blade.

27. The method of attaching a depth stop to a hole saw as defined in claim 25, wherein said depth stop can be removed from said hole saw, flipped 180 degrees and reattached to said hole saw.

* * * * *

UNITED STATES PATENT AND TRADEMARK OFFICE
CERTIFICATE OF CORRECTION

PATENT NO.        : 8,647,032 B2                                Page 1 of 1
APPLICATION NO.   : 12/579655
DATED             : February 11, 2014
INVENTOR(S)       : Nordlin et al.

It is certified that error appears in the above-identified patent and that said Letters Patent is hereby corrected as shown below:

In the Specification

In Column 2, Line 16, delete "toot" and insert -- tool --, therefor.

In Column 2, Line 26, delete "thereof" and insert -- thereof, --, therefor.

In Column 3, Line 47, delete "equidistantly" and insert -- equi-distantly --, therefor.

In Column 5, Line 45, delete "302e" and insert -- 302c --, therefor.

In Column 6, Line 24, delete "car 82," and insert -- ear 82, --, therefor.

Signed and Sealed this
Twenty-ninth Day of April, 2014

Michelle K. Lee
*Deputy Director of the United States Patent and Trademark Office*